United States Patent Office 3,255,165
Patented June 7, 1966

3,255,165
COPOLYMERS OF VINYL CHLORIDE AND BICYCLO[2.2.1]HEPT-2-YL ACRYLATE
Frank J. Welch, Charleston, W. Va., assignor to Union Carbide Corporation, a corporation of New York
No Drawing. Filed Dec. 17, 1962, Ser. No. 244,931
3 Claims. (Cl. 260—86.3)

This invention relates to novel polymers containing vinyl chloride. More particularly, this invention relates to normally solid copolymers of vinyl chloride and bicyclo[2.2.1]hept-2-yl acrylate.

It is well known that, although vinyl chloride polymerizes to form a rigid, inert, non-flammable homopolymer, the poly(vinyl chloride) is unsuitable for many applications because of its poor stability to heat and light. For example, poly(vinyl chloride) has a high softening point and, unless stabilizers, plasticizers and the like are added, can not be fabricated by melt processing techniques without excessive thermal degradation. In an effort to improve the high temperature properties and suitability for melt fabrication of vinyl chloride polymers, vinyl acetate has been copolymerized with vinyl chloride. Although the resulting vinyl acetate/vinyl chloride copolymers have improved melt processability, they still have relatively poor stability toward light and heat and, in addition, have marginal heat distortion temperatures. If alkyl acrylate esters, such as ethyl acrylate, are copolymerized with vinyl chloride instead of vinyl acetate, the resulting copolymers, although having improved light and heat stability, are unsuitable for use as rigid resins because of low heat distortion temperatures.

It has now been discovered that when vinyl chloride is copolymerized with bicyclo[2.2.1]hept-2-yl acrylate a normally solid copolymer is produced which has a lower processing temperature, better heat and light stability, and only a slightly lower heat distortion temperature than poly(vinyl chloride). The lower melting point and higher thermal stability of the copolymers of this invention, when compared with other vinyl chloride copolymers, makes available for the first time rigid vinyl chloride polymers which can be processed by extrusion and injection molding techniques.

The copolymers of this invention contain from about 1 to about 99 weight percent polymerized bicyclo[2.2.1]hept-2-yl acrylate and from about 99 to about 1 weight percent polymerized vinyl chloride. In general, as the amount of bicyclo[2.2.1]hept-2-yl acrylate in the copolymer increases, the heat and light stability of the copolymer and solubility of the copolymer in aromatic solvents increases, while the softening point decreases slightly and the flame resistance decreases. Copolymers having from 1 to about 30 weight percent polymerized bicyclo[2.2.1]hept-2-yl acrylate are nonflammable and have improved light and heat stability over poly(vinyl chloride) while having a heat distortion temperature about the same as that of poly(vinyl chloride). In addition, these copolymers have mill temperatures (the temperature at which the polymer melts during milling) which are lower than that of poly(vinyl chloride). Copolymers having from about 30 to about 99, preferably from about 30 to about 70, weight percent polymerized bicyclo[2.2.1]hept-2-yl acrylate have superior heat and light stability, are soluble in organic solvents, as for example, toluene, and are useful in coating applications, with copolymers containing at least about 50 weight percent polymerized bicyclo[2.2.1]hept-2-yl acrylate having excellent clarity.

The copolymers of this invention are produced according to well-known free radical polymerization procedures, such as bulk, suspension, emulsion, or solution processes, employing batch, semi-continuous or continuous polymerization procedures.

In general, the polymerization is conducted by heating vinyl chloride and bicyclo[2.2.1]hept-2-yl acrylate in contact with a free-radical catalyst at a temperature of from about 25° C. to about 100° C., with temperatures of from about 35° C. to about 65° C. preferred. The weight ratio of bicyclo[2.2.1]hept-2-yl acrylate to vinyl chloride in the charge can vary from about 0.005:1 to about 4:1. The amount of free-radical catalyst employed can vary from about 10 to about 20,000 parts per million, based on the total weight of the comonomers, with from about 100 to about 10,000 parts per million preferred.

Bicyclo[2.2.1]hept-2-yl acrylate exists in two stereoisomeric forms, the exo-isomer, which is produced by the reaction of acrylic acid with bicyclo[2.2.1]hept-2-ene in the presence of an acid condensing agent as disclosed in United States Patent 2,425,173, and the endo-isomer, which is produced by the esterification of endo-bicyclo[2.2.1]heptan-2-ol (produced by the Diels Alder addition reaction of cyclopentadiene with vinyl acetate followed by hydrolysis and hydrogenation of the endo-bicyclo[2.2.1]hept-5-en-2-yl acetate as disclosed by Winstein et al., JACS, 74, 1147 (1952)) with acrylic acid according to methods known to those skilled in the art. However, the polymerization characteristics of the stereoisomers and the properties of their copolymers with vinyl chloride are substantially the same. Accordingly, no distinction between the exo- and endo-isomers will be made in the specification or claims.

By the term "free-radical catalyst" is meant a compound which produces a free radical at the polymerization conditions employed. This type of catalyst is well known and includes peroxides, such as acetyl peroxide, peracetic acid, benzoyl peroxide, acetyl benzoyl peroxide, hydroxyheptyl peroxide, isopropyl percarbonate, methyl ethyl ketone peroxide, cyclohexanone peroxide, cyclohexyl peroxide, 2,4-dichlorobenzoyl peroxide, cumene hydroperoxide, tert.-butyl hydroperoxide, methyl amyl ketone peroxide, lauroyl peroxide, methyl cyclohexyl hydroperoxide, tert.-butyl permaleic acid, tert.-butyl perbenzoate, di-tert.-butyl diperphthalate, ammonium persulfate, and the like; azo compounds, such as α,α'-azodiisobutyronitrile, azobis-2-phenylacetonitrile, azobis-2,2-diphenylacetonitrile, and the like; redox systems, such as peroxides in admixture with reducing agents such as sulfurous acid, sulfur dioxide, alkali metal sulfites and bisulfites, and the like, etc.

The rate of copolymerization of bicyclo[2.2.1]hept-2-yl acrylate is faster than that of vinyl chloride. Thus, if all of the bicyclo[2.2.1]hept-2-yl acrylate is initially charged to the reaction, a non-uniform copolymer is produced; the copolymer formed early in the copolymerization being richer in the bicyclo[2.2.1]hept-2-yl acrylate than the copolymer formed near the end of the copolymerization. This non-uniform copolymer has poorer heat and light stability than a uniform copolymer having a similar over-all bicyclo[2.2.1]hept-2-yl acrylate/vinyl chloride ratio. Accordingly, it is preferred to continuously feed bicyclo[2.2.1]hept-2-yl acrylate to the polymerization mixture at a rate sufficient to maintain a substantially constant molar ratio of bicyclo[2.2.1]hept-2-yl acrylate monomer to vinyl chloride monomer in the reaction mixture.

The copolymers of this invention are recovered from the reaction according to methods known to those skilled in the art.

The following examples are illustrative:

*Examples 1–4*

A 2-liter, stainless steel pressure vessel was charged with 782.4 grams of vinyl chloride, 17.6 grams of bicyclo[2.2.1]hept-2-yl acrylate, 200 grams of acetone and 0.32 gram of acetyl peroxide. The vessel was flushed with nitrogen, sealed and the reaction mixture was heated at 35° C. to 45° C. for 25.25 hours. During this time, 23.2 grams of bicyclo[2.2.1]hept-2-yl acrylate, 4.0 grams of acetone and 1.0 gram of azo-isobutyrodinitrile were added in small increments. The reaction mixture was then cooled and poured into methanol, whereby the bicyclo[2.2.1]hept-2-yl acrylate/vinyl chloride copolymer was precipitated. After filtering from the methanolic mixture, washing with methanol and drying, the copolymer weighed 110 grams. Chlorine analysis indicated that the copolymer contained 77.2 weight percent polymerized vinyl chloride. The vinyl chloride/bicycloheptyl acrylate copolymer had a reduced viscosity of 0.57 as determined at 30° C. from a solution of 0.2 gram of the copolymer in 100 milliliters of cyclohexanone.

Employing similar procedures three additional runs were conducted. The charge concentrations, amounts added during the polymerization, polymerization reaction conditions, and results of each of these runs are set forth in Table A, below, with the data from the above-described experiment being included as Example 1.

TABLE A.—SOLUTION COPOLYMERIZATION OF VINYL CHLORIDE AND BUCYCLO [2.2.1] HEPT-2-YL ACRYLATE

| Example | 1 | 2 | 3 | 4 |
|---|---|---|---|---|
| Charge: | | | | |
| Vinyl chloride, grams | 782.4 | 693 | 693 | 280 |
| Bicyclo [2.2.1] hept-2-yl acrylate, grams | 17.6 | 7.0 | 7.0 | 420 |
| Acetone, grams | 200 | 300 | 300 | 375 |
| Diacetyl peroxide, grams | 0.32 | 0 | 0 | 0 |
| Added: | | | | |
| Bicyclo [2.2.1] hept-2-yl acrylate, grams | 23.2 | 3.0 | 8.2 | 118 |
| Acetone, grams | 4.0 | | | |
| Diacetyl peroxide, grams | | 3.5 | 6.75 | 2.5 |
| Azo-isobutyrodinitrile, grams | 1.0 | | | |
| Reaction Conditions: | | | | |
| Temperature, ° C | 35–45 | 40 | 40 | 42 |
| Time, hours | 25.25 | 5.07 | 12 | 6.08 |
| Copolymer: | | | | |
| Yield, grams | 110 | 75 | 140 | 148 |
| Reduced viscosity | 0.57 | 0.92 | 0.86 | 1.94 |
| Vinyl chloride, wt. percent | 77.2 | 90.5 | 91.6 | 10.0 |
| Bicyclo [2.2.1] hept-2-yl acrylate, wt. percent | 22.8 | 9.5 | 8.4 | 90.0 |

*Examples 5–9*

A 1.5-gallon, stainless steel, stirrer-equipped autoclave was charged with 776 grams of vinyl chloride, 24 grams of bicyclo[2.2.1]hept-2-yl acrylate, 2600 grams of water and 600 grams of n-heptane. The autoclave was flushed with nitrogen, sealed and heated at 48 to 54° C. for 9 hours, during which time an additional 25.9 grams of bicyclo[2.2.1]hept-2-yl acrylate, 22 grams of water, 4.0 grams of ammonium persulfate and 1.3 grams of sodium bisulfite were added. The contents of the autoclave were then cooled, the autoclave was opened and the solid vinyl chloride/bicyclo[2.2.1]hept-2-yl acrylate copolymer was filtered from the reaction mixture. After washing with alcohol and drying the copolymer weighed 545 grams. Chlorine analysis indicated that the copolymer contained 90.2 weight percent polymerized vinyl chloride. The copolymer had a reduced viscosity of 0.72 as determined at 30° C. from a solution of 0.2 gram of the copolymer in 100 milliliters of cyclohexanone.

Employing similar procedures, four additional runs were conducted, one of which also employed diacetyl peroxide as a catalyst and another of which employed sulfur dioxide as the reducing agent for the redox catalyst. The charge composition, reaction conditions and results of these runs are set forth in Table B, below, with the data for the above-described experiment being included as Example 5.

TABLE B.—SUSPENSION POLYMERIZATION OF VINYL CHLORIDE AND BICYLO[2.2.1]HEPT-2-YL ACRYLATE

| Example | 5 | 6 | 7 | 8 | 9 |
|---|---|---|---|---|---|
| Charge: | | | | | |
| Vinyl chloride, grams | 776 | 1,067 | 1,067 | 1,067 | 1,023 |
| Bicyclo[2.2.1]hept-2-yl acrylate, grams | 24 | 33 | 33 | 33 | 77 |
| Water, grams | 2,600 | 2,475 | 2,175 | 2,175 | 2,175 |
| Heptane, grams | 600 | 825 | 725 | 725 | 725 |
| Added: | | | | | |
| Bicyclo[2.2.1]hept-2-yl acrylate, grams | 25.9 | 26.3 | 5 | 31.5 | 18 |
| Water, grams | 22 | 8 | 29 | 18 | 29 |
| Diacetyl peroxide, grams | | 2.75 | | | |
| Ammonium persulfate, grams | 4.0 | 2.0 | 3.0 | 4.0 | 10.0 |
| Sodium bisulfite, grams | 1.3 | 0.2 | 1.25 | 0.65 | 0.5 |
| Sulfur dioxide, grams | | | | | 0.24 |
| Reaction Conditions: | | | | | |
| Temperature, ° C | 48–54 | 45 | 47 | 46–55 | 47 |
| Time, hours | 9 | 9.5 | 6.75 | 3.66 | 12 |
| Product: | | | | | |
| Yield, grams | 545 | 50.1 | 37.9 | 320 | 126 |
| Reduced viscosity | 0.72 | 0.63 | | 0.78 | 0.79 |
| Vinyl chloride, wt. percent | 90.2 | | 71.2 | 86.5 | 72.7 |
| Bicyclo[2.2.1]hept-2-yl acrylate, wt. percent | 9.8 | | 29.8 | 13.5 | 27.3 |

*Examples 10–28*

A 2-liter, stainless steel autoclave was charged with 293.4 grams of vinyl chloride, 6.6 grams of bicyclo[2.2.1]hept-2-yl acrylate, 700 grams of water, 3.0 grams of a sulfonated fatty alcohol (sold under the name "Orvus Paste"), 1.5 grams of sodium 3,8-diethyldodec-5-yl sulfate, (sold under the name "Tergitol 4"), and 1.0 gram of sodium bisulfite. The autocalve was flushed with nitrogen, sealed and heated at 45 to 50° C. for 8.42 hours. Over this time, 6.0 grams of ammonium persulfate and an additional 12 grams of bicyclo[2.2.1]hept-2-yl acrylate and 29 grams of water were added in small increments. At the end of the reaction, the contents were cooled and the emulsion was broken by the addition of 5 milliliters of a 25 percent calcium chloride solution, whereby the solid vinyl chloride/bicyclo[2.2.1]hept-2-yl acrylate copolymer was precipitated. After filtering from the reaction mixture, washing with water and then with ethanol, and drying, the copolymer weighed 128 grams. Chlorine analysis indicated that the copolymer contained 84.2 weight percent polymerized vinyl chloride. The reduced viscosity of the copolymer was 0.83 as determined at 30° C. from a solution of 0.2 gram of the copolymer in 100 milliliters of cyclohexanone.

Employing similar procedures, eighteen additional runs were conducted. The charge compositions, reaction conditions, and results are summarized in Table C, below, with the data for the above-described experiment being included as Example 10.

clave was sealed and heated at 50° C. for 7.75 hours, during which time an additional 0.85 pound of bicyclo[2.2.1]hept-2-yl acrylate was added in increments. The reaction mixture was cooled to 25° C. and then admixed with calcium chloride to coagulate the vinyl chloride/bicyclo[2.2.1]hept-2-yl acrylate copolymer which had formed. The copolymer, after washing with isopropanol and drying, weighed 6.8 pounds. Chlorine analysis indicated that the copolymer contained 85.9 weight percent polymerized vinyl chloride. The copolymer had a re- TABLE C.—EMULSION POLYMERIZATION OF VINYL CHLORIDE AND BICYCLO [2.2.1] HEPT-2-YL ACRYLATE

| Example | 10 | 11 | 12 | 13 | 14 | 15 | 16 | 17 | 18 | 19 |
|---|---|---|---|---|---|---|---|---|---|---|
| Charge: | | | | | | | | | | |
| Vinyl chloride, grams | 293.4 | 293.4 | 293.4 | 244.5 | 244.5 | 244.5 | 234.7 | 223.2 | 204 | 204 |
| Bicyclo [2.2.1] hept-2-yl acrylate, grams | 6.6 | 6.6 | 6.6 | 5.5 | 5.5 | 5.5 | 5.5 | 3.3 | 16.8 | 36 | 36 |
| Water, grams | 700 | 640 | 700 | 750 | 750 | 750 | 960 | 960 | 960 | 960 |
| "Orvus Paste",[a] grams | 3.0 | | | | | | | | | |
| "Tergitol 4",[b] grams | 1.5 | | | | | | | | | |
| "Aerosol OT",[c] grams | | 32 | 3.0 | 2.5 | 2.5 | 3.0 | 3.6 | 3.6 | 3.6 | 3.6 |
| "Tergitol NPX",[d] grams | | | | | | | | | | |
| "Dupanol ME",[e] grams | | | | | | | | | | |
| "Avitex AD",[f] grams | | | | | | | | | | |
| Sodium Bisulfite, grams | 1.0 | 1.0 | 1.0 | | | | | | | |
| Sulfur dioxide, grams | | | | | | | | | | |
| Added: | | | | | | | | | | |
| Bicyclo [2.2.1] hept-2-yl acrylate, grams | 12 | | | 12 | 11.2 | 9.0 | 12.9 | 20.5 | 17.4 | 26.6 |
| Water, grams | 29 | 5 | 2 | 7 | | 5 | 5 | 10 | 9 | 10 |
| Diacetyl peroxide, grams | | | | | 0.75 | | | | | |
| Ammonium persulfate, grams | 6.0 | 1.0 | 0.5 | 0.5 | | 1.0 | 0.3 | 1.44 | 1.5 | 2.0 |
| Sodium bisulfite, grams | | | | 0.2 | | | | | 0.1 | |
| Sulfur dioxide, grams | | | | | | | | | | |
| Reaction Conditions: | | | | | | | | | | |
| Temperature, °C | 45–50 | 45–47 | 45–60 | 45–60 | 45 | 45 | 50 | 45 | 45–50 | 45 |
| Time, hours | 8.42 | 0.75 | 0.25 | 8 | 5 | 8 | 5.25 | 4.75 | 3.8 | 3 |
| Product: | | | | | | | | | | |
| Yield, grams | 128 | 45 | 205 | 238 | 75.0 | 103 | 114 | 94.5 | 141 | 74.3 |
| Reduced viscosity | 0.83 | 1.88 | 0.75 | 0.96 | 1.25 | 1.42 | 1.22 | 1.37 | 1.42 | 1.38 |
| Vinyl chloride, wt. percent | 84.2 | 79.3 | 95 | 94.8 | 87.4 | 89.2 | 88.0 | 68.3 | 70.5 | 57.7 |
| Bicyclo[2.2.1]hept-2-yl acrylate, wt. percent | 15.8 | 20.7 | 5 | 5.2 | 12.6 | 10.8 | 12.0 | 31.7 | 29.5 | 42.3 |

| Example | 20 | 21 | 22 | 23 | 24 | 25 | 26 | 27 | 28 |
|---|---|---|---|---|---|---|---|---|---|
| Charge: | | | | | | | | | |
| Vinyl chloride, grams | 204 | 158.4 | 158.4 | 244.5 | 158.4 | 118.8 | 72 | 72 | 72 |
| Bicyclo[2.2.1]hept-2-yl acrylate, grams | 36 | 81.6 | 81.6 | 5.5 | 1.6 | 61.2 | 108 | 108 | 108 |
| Water, grams | 960 | 960 | 960 | | 960 | 1,020 | 1,020 | 1,020 | 1,020 |
| "Orvus Paste",[a] grams | | | | | | | | | |
| "Tergitol 4",[b] grams | | | | | | | | | |
| "Aerosol OT",[c] grams | 3.6 | 3.6 | 4.8 | | | | | | |
| "Tergitol NPX",[d] grams | | | | 2.5 | | | | | |
| "Dupanol ME",[e] grams | | | | 1.25 | | | | | |
| "Avitex AD",[f] grams | | | | | 7.2 | 3.6 | 3.6 | 3.6 | 3.6 |
| Sodium Bisulfite, grams | | | | | | | | | |
| Sulfur dioxide, grams | | | | | | | | 0.25 | 0.05 |
| Added: | | | | | | | | | |
| Bicyclo[2.2.1]hept-2-yl acrylate, grams | 41 | 21.8 | 79.8 | 11.2 | 40.4 | 85.5 | 10 | 15 | 86 |
| Water, grams | 8 | 8 | 8 | | 8 | 16 | 14 | 3 | 12 |
| Diacetyl peroxide, grams | | | | 0.75 | | | | | |
| Ammonium persulfate, grams | 1.8 | 1.8 | 1.8 | | 1.8 | 2.05 | 1.65 | 0.2 | 0.8 |
| Sodium bisulfite, grams | | | | | | | 0.3 | | |
| Sulfur dioxide, grams | | | | | | | | | |
| Reaction Conditions: | | | | | | | | | |
| Temperature, °C | 45 | 45 | 45–47 | 45 | 45 | 45 | 45–55 | 50–60 | 50 |
| Time, hours | 8.7 | 3.6 | 4.75 | 8 | 3.84 | 13.5 | 6 | 0.38 | 6.75 |
| Product: | | | | | | | | | |
| Yield, grams | 122 | 60 | 276 | 63 | 100.2 | 153 | 145 | 177 | 209 |
| Reduced viscosity | 1.33 | 2.13 | 2.19 | 1.15 | 2.10 | 2.51 | 0.77 | 1.52 | 3.29 |
| Vinyl chloride, wt. percent | 51.8 | 25.6 | 44.6 | 85.2 | 25.4 | 28.3 | 33.8 | 33.6 | 22.0 |
| Bicyclo[2.2.1]hept-2-yl acrylate, wt. percent | 48.2 | 74.4 | 55.4 | 14.8 | 74.6 | 71.7 | 66.2 | 66.4 | 78.0 |

[a] "Orvus Paste"—Sulfated fatty alcohol.
[b] "Tergitol 4"—Sodium 3,8-diethyldodec-5-yl sulfate.
[c] "Aerosol OT"—Dioctyl sodium sulfosuccinate.
[d] "Tergitol NPX"—Nonylphenyl ether of polyethylene glycol.
[e] "Dupanol ME"—Sodium lauryl sulfate.
[f] "Avitex AD"—fatty alcohol sulfates.

*Examples 29–33*

A 5-gallon, glass-lined autoclave was purged with vinyl chloride and then charged with 10.7 pounds of vinyl chloride, 2.97 pound of bicyclo[2.2.1]hept-2-yl acrylate, 33.0 pounds of water, 0.1005 pound of dioctyl sodium sulfosuccinate ("Aerosol OT"), 0.0253 pound of potassium persulfate, 0.000253 pound of soduim bisulfite and 0.0198 pound of tert.-dodecyl mercaptan. The autoduced viscosity of 0.90 as determined at 30° C. from a solution of 0.2 gram of the copolymer in 100 milliliters of cyclohexanone.

Employing similar procedures, four additional runs were conducted. The charge compositions, reaction conditions and results are summarized in Table D, below, with the data for the above-described experiment being included as Example 29.

TABLE D

| Example | 29 | 30 | 31 | 32 | 33 |
|---|---|---|---|---|---|
| Charge: | | | | | |
| Vinyl chloride, pounds | 10.7 | 10.5 | 9.7 | 9.3 | 9.3 |
| Bicyclo [2.2.1]hept-2-yl acrylate, pounds | 2.97 | 0.32 | 0.3 | 0.7 | 0.7 |
| Water, pounds | 33.0 | 30.0 | 30.0 | 30.0 | 30.0 |
| "Aerosol OT", [a] pounds | 0.1005 | 0.1005 | 0.1 | 0.1 | 0.1 |
| Potassium persulfate, pounds | 0.0253 | 0.0249 | 0.025 | 0.025 | 0.025 |
| Sodium bisulfite, pounds $\times 10^{-4}$ | 2.53 | 2.49 | 2.5 | 2.5 | 2.5 |
| Tert.-Dodecyl mercaptan, pounds | 0.0198 | 0.040 | | | 0.020 |
| Added: Bicyclo[2.2.1]hept-2-yl acrylate, pounds | 0.85 | 0.855 | 0.855 | 1.525 | 1.71 |
| Reaction Conditions: | | | | | |
| Temperature, ° C | 50 | 50 | 45 | 45 | 50 |
| Time, hours | 7.75 | 7.0 | 9.0 | 8.0 | 17.4 |
| Product: | | | | | |
| Yield, pounds | +6.8 | 5.7 | 4.4 | 3.7 | 4.8 |
| Reduced viscosity | 0.90 | 0.81 | 1.50 | 1.59 | 1.53 |
| Vinyl chloride, wt. percent | 85.9 | 83.9 | 79.5 | 66.7 | 65.2 |
| Bicyclo[2.2.1]hept-2-yl acrylate, wt. percent | 14.1 | 16.1 | 20.5 | 33.3 | 34.8 |

[a] "Aerosol OT"—Dioctyl sodium sulfosuccinate.

The characteristics of several of the vinyl chloride/bicyclo[2.2.1]hept-2-yl acrylate polymers produced as described in the foregoing examples were determined by the following tests:

PHYSICAL PROPERTIES (AT ROOM TEMPERATURE)

(1) Yield stress—ASTM D 882–56 T
(2) Elongation at yield—ASTM D 882–56 T
(3) Tensile strength—ASTM D 882–56 T
(4) Ultimate elongation—ASTM D 882–56 T
(5) Stiffness modulus—ASTM D 882–56 T
(6) Impact resistance—Gardner inpact test. A known weight is dropped a known distance on a plaque having a known thickness, approximately 80 millimeters) until breakage occurs.

THERMAL PROPERTIES (1) Heat distortion temperature—ASTM D 648–56
(2) Glass transistion temperature—Determined from a plot of the logarithm of stiffness modulus against temperature and is the temperature at which the stiffness modulus first rapidly decreases with increasing temperature.

OTHER PROPERTIES (DETERMINED ON A PLAQUE 3 INCHES IN DIAMETER AND 0.02 INCH THICK.)

(1) Flammability—Determined empirically by attempting to light the plaque with the flame from a match. The polymer is non-flammable if it does not sustain a flame on removal of the burning match.

(2) Heat stability—Determined by heating a plaque at 170° C. for 5 hours and visually rated according to the amount of discoloration as follows:
    A—No or only slight discoloration,
    B—Yellow color,
    C—Brown color,
    D—Black (3) Light stability—Determined by subjecting a plaque to ultra-violet radiation for about 16 days and visually rated according to the amount of discoloration as follows:
    A—No discoloration,
    B—Yellow color,
    C—Brown color,
    D—Black TABLE E.—PROPERTIES OF BICYCLO[2.2.1]HEPT-2-YL ACRYLATE/VINYL CHLORIDE COPOLYMERS

| Copolymer Composition | Bicyclo[2.2.1]hept-2-yl Acrylate/Vinyl Chloride Copolymers | | | | | | | |
|---|---|---|---|---|---|---|---|---|
| Bicyclo[2.2.1]hept-2-yl acrylate, wt. percent | 8.4 | 9.5 | 10.8 | 12 | 14.1 | 15.8 | 16.1 | 20.5 |
| Vinyl chloride, wt. percent | 91.6 | 90.5 | 89.2 | 88 | 85.9 | 84.2 | 83.9 | 79.5 |
| Copolymer Properties: | | | | | | | | |
| Reduced viscosity | 0.86 | 0.42 | 1.42 | 1.22 | 0.90 | 0.83 | 0.81 | 1.50 |
| Heat distortion temperature, ° C | 70 | 71 | 74 | 71 | 69 | 81 | 63 | 65 |
| Glass transition temperature, ° C | 80 | 80 | 80 | 78 | | | 80 | |
| Yield Stress, p.s.i. $\times 10^{-3}$ | 7.84 | | 7.80 | | 9.15 | | 9.13 | 8.80 |
| Elongation at yield, percent | 5.1 | | 4.8 | | 5 | | 5 | 5 |
| Tensile strength, p.s.i. $\times 10^{-3}$ | 6.05 | 7.30 | 6.34 | 7.50 | 6.95 | | 6.44 | 6.75 |
| Ultimate elongation, percent | 50.9 | 4.2 | 193 | 4.5 | 41 | | 20 | 10 |
| Stiffness Modulus, p.s.i. $\times 10^{-4}$ | 25.7 | 28.2 | 25.8 | 26.0 | 26.2 | 20.8 | 24.7 | 27.0 |
| Gardner impact strength, inch-pounds | 4 | 10 | 65 | 8 | 24 | 8 | 10 | 10 |
| Flammability | No | No | No | No | No | | No | No |
| Heat stability | 3 | 3 | 3 | | 2 | | 2 | 2 |
| Light stability | 2 | 2 | 3 | 2 | | | | |
| Example Number | 3 | 2 | 15 | 16 | 29 | 10 | 30 | 31 |

| Copolymer Composition | Bicyclo [2.2.1] hept-2-yl Acrylate/Vinyl Chloride Copolymers | | | | | | | (Polyvinyl Chloride) | Vinyl Acetate/Vinyl Chloride Copolymer |
|---|---|---|---|---|---|---|---|---|---|
| Bicyclo [2.2.1] hept-2-yl acrylate, wt. percent | 27.3 | 31.7 | 33.3 | 34.8 | 71.7 | 74.4 | 90 | | 14 |
| Vinyl chloride, wt. percent | 72.7 | 68.3 | 66.7 | 65.2 | 28.3 | 25.6 | 10 | 100 | 86 |
| Copolymer Properties: | | | | | | | | | |
| Reduced viscosity | 0.79 | 1.37 | 1.59 | 1.53 | 2.51 | 2.13 | 1.94 | 0.55 | 0.56 |
| Heat distortion temperature, ° C | 68 | 58 | 63 | 59 | 62 | 59 | 63 | 73 | 63 |
| Glass transition temperature, ° C | 70 | 77 | | | | | | 79 | 68 |
| Yield Stress, p.s.i. $\times 10^{-3}$ | | | | | | | | 6.80 | 6.40 |
| Elongation at yield, percent | | | | | | | | 5 | 4 |
| Tensile strength, p.s.i. $\times 10^{-3}$ | 8.44 | 7.81 | 10.23 | 10.50 | 6.21 | 6.32 | 2.35 | 5.60 | 5.00 |
| Ultimate elongation, percent | 5.0 | 4.2 | 5 | 5 | 35 | 2.5 | 0.8 | 58 | 18 |
| Stiffness Modulus, p.s.i. $\times 10^{-4}$ | 27.6 | 26.1 | 28.4 | 28.3 | 25.6 | 23.9 | 26.0 | 25.5 | 2.92 |
| Gardner impact strength, inch-pounds | 3 | 4 | 3 | 3 | 0.5 | 0.5 | 0.5 | 10 | |
| Flammability | No | No | Yes | Yes | Yes | Yes | Yes | No | No |
| Heat stability | 2 | 2 | 2 | 2 | 1 | 1 | 1 | 4 | 4 |
| Light stability | 2 | 2 | | | 1 | 1 | 1 | 4 | 4 |
| Example Number | 9 | 17 | 32 | 33 | 25 | 21 | 4 | | |

The results of these tests are summarized in Table E above together with the data for similar tests conducted on poly(vinyl chloride) and on a 14 weight percent vinyl acetate/86 weight percent vinyl chloride copolymer for purposes of comparison.

From Table E it can be seen that the vinyl-chloride/bicyclo[2.2.1]hept-2-yl acrylate copolymers of this invention are uniformly superior to the poly(vinyl chloride) and to the vinyl acetate/vinyl chloride copolymer tested with regard to thermal and light stability. Furthermore, the heat distortion temperatures of the copolymers of this invention are intermediate the values for poly(vinyl chloride) and the vinyl acetate/vinyl chloride copolymer, even though the glass transition temperatures of the copolymers of this invention are generally equivalent to that of poly(vinyl chloride). Thus, the copolymers of this invention are readily subject to processing by melt fabrication techniques and yet are suitable for use in applications requiring rigid resins.

In addition to improved heat and light resistance, the copolymers of this invention have improved physical properties when compared with poly(vinyl chloride) or the vinyl chloride/vinyl acetate copolymer tested, having a higher yield stress, tensile strengths and stiffness modulus than the polymers of the prior art.

What is claimed is:
1. A uniform copolymer of vinyl chloride and bicyclo-[2.2.1]hept-2-yl acrylate containing from 1 to 99 weight percent polymerized vinyl chloride and from 99 to 1 weight percent polymerized bicyclo[2.2.1]hept-2-yl acrylate, said copolymer being produced by copolymerizing monomeric vinyl chloride and monomeric bicyclo[2.2.1] hept-2-yl acrylate in contact with a free-radical catalyst under conditions such that the molar ratio of monomeric vinyl chloride to monomeric bicyclo[2.2.1]hept-2-yl acrylate in the reaction mixture is at a substantially constant preselected value.

2. A uniform copolymer of vinyl chloride and bicyclo-[2.2.1]hept-2-yl acrylate containing from 1 to 30 weight percent polymerized bicyclo[2.2.1]hept-2-yl acrylate and from 99 to 70 weight percent polymerized vinyl chloride, said copolymer being produced by copolymerizing monomeric vinyl chloride and monomeric bicyclo[2.2.1] hept-2-yl acrylate in contact with a free-radical catalyst under conditions such that the molar ratio of monomeric vinyl chloride to monomeric bicyclo[2.2.1]hept-2-yl acrylate in the reaction mixture is at a substantially constant preselected value.

3. A uniform copolymer of vinyl chloride and bicyclo-[2.2.1]hept-2-yl acrylate containing from 30 to 70 weight percent polymerized bicyclo[2.2.1]hept-2-yl acrylate and from 70 to 30 weight percent polymerized vinyl chloride, said copolymer being produced by copolymerizing monomeric vinyl chloride and monomeric bicyclo[2.2.1] hept-2-yl acrylate in contact with a free-radical catalyst under conditions such that the molar ratio of monomeric vinyl chloride to monomeric bicyclo[2.2.1]hept-2-yl acrylate in the reaction mixture is at a substantially constant preselected value.

References Cited by the Examiner
UNITED STATES PATENTS

| | | | |
|---|---|---|---|
| 2,732,369 | 1/1956 | Caldwell et al. | 260—87.5 |
| 2,838,479 | 6/1958 | Biletch | 260—89.5 |
| 3,022,277 | 2/1962 | Nelson | 260—89.5 |
| 3,038,887 | 6/1962 | Caldwell et al. | 260—486 |

JOSEPH L. SCHOFER, *Primary Examiner.*
DONALD E. CZAJA, *Examiner.*